(12) United States Patent
Stojkovic (10) Patent No.: US 11,400,985 B2
(45) Date of Patent: Aug. 2, 2022

(54) ROOF JOINT STRUCTURE

(71) Applicant: Ford Global Technologies, LLC, Dearborn, MI (US)

(72) Inventor: Dragan B. Stojkovic, Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/112,921

(22) Filed: Dec. 4, 2020

(65) Prior Publication Data

US 2022/0177039 A1 Jun. 9, 2022

(51) Int. Cl.
*B62D 25/06* (2006.01)
*B62D 27/02* (2006.01)
*B62D 25/04* (2006.01)
*B62D 23/00* (2006.01)

(52) U.S. Cl.
CPC ........... *B62D 25/06* (2013.01); *B62D 23/005* (2013.01); *B62D 25/04* (2013.01); *B62D 27/023* (2013.01)

(58) Field of Classification Search
CPC ....... B62D 25/04; B62D 25/06; B62D 23/005
USPC ..... 296/205, 29, 30, 193.06, 203.01, 203.03
See application file for complete search history.

(56) References Cited

U.S. PATENT DOCUMENTS

| 2,881,017 | A | * | 4/1959 | Millar, Jr. | F16B 7/182 |
| | | | | | 403/340 |
| 3,982,779 | A | * | 9/1976 | Hickey | F16L 21/06 |
| | | | | | 285/328 |
| 4,986,597 | A | | 1/1991 | Clausen | |
| 6,022,070 | A | * | 2/2000 | Ashina | B62D 23/005 |
| | | | | | 296/205 |
| 6,361,244 | B1 | * | 3/2002 | Ni | B62D 23/005 |
| | | | | | 403/345 |
| 6,412,857 | B2 | | 7/2002 | Jaekel et al. | |
| 7,758,109 | B2 | | 7/2010 | Reed et al. | |
| 8,162,388 | B2 | | 4/2012 | Balzer et al. | |
| 9,884,652 | B2 | * | 2/2018 | Elfwing | B62D 25/04 |
| 10,294,970 | B2 | * | 5/2019 | Hand | F16B 5/0008 |
| 11,124,240 | B2 | * | 9/2021 | Ristoski | B21C 23/142 |
| 2010/0244497 | A1 | | 9/2010 | Honda et al. | |

* cited by examiner

*Primary Examiner* — Dennis H Pedder
(74) *Attorney, Agent, or Firm* — Burris Law, PLLC (57) ABSTRACT

The present disclosure relates to a vehicle that includes a first roof beam that has a first cross-sectional area. The first roof beam includes an end and an indentation at the end. The vehicle includes a second beam that has a second cross-sectional area and is coupled to the first roof beam at the indentation, such that the second cross-sectional area is smaller than the first cross-sectional area.

20 Claims, 6 Drawing Sheets

ROOF JOINT STRUCTURE

BACKGROUND

Technical Field

The present disclosure relates to aspects of joining parts of a vehicle's frame.

Description of the Related Art

An off-road vehicle is a class of vehicle that is capable of driving on a paved surface and gravel or a rock surface. The off-road vehicle generally has a tubular chassis manufactured by joining tubes using brackets. For instance, a tube forming a roof rail of a frame is attached at a joint to another tube that forms an A-pillar of the frame using the brackets. In some off-road vehicles, an open air configuration is provided that impacts an arrangement of the frame along the roof.

BRIEF SUMMARY

The present disclosure relates to aspects of joining tubes to form a frame of a vehicle that may have an open-air roof configuration. The vehicle may be a sport-utility vehicle or any other vehicle that includes a large, beam-free area of the roof. In order to effectively couple and transfer a load between frame beams or tubes along a windshield and beams along the roof, the present disclosure is directed to features at ends of these beams.

The roof beam, i.e. a first beam includes a first end surface adjacent to the windshield and an indentation at the first end surface. The indentation may be on an interior or passenger cabin side of the first beam. The beam along the windshield, i.e. an A-pillar or a second beam is coupled to the first roof beam at the indentation and has a second end surface that overlaps the first end surface. The first roof beam has a first cross-sectional area that is greater than a second cross-sectional area of the second beam.

A first bracket may be coupled to an interior side of the first roof beam and the second beam, while a second bracket may be coupled to an exterior side of the first roof beam and the second beam. The first and second brackets can provide additional stability to a joint formed between the first roof beam and the second beam along the windshield.

DETAILED DESCRIPTION

In the following description, certain specific details are outlined in order to provide a thorough understanding of various disclosed embodiments. However, one skilled in the relevant art will recognize that embodiments may be practiced without one or more of these specific details, or with other methods, components, materials, etc. In other instances, well-known structures or methods associated with vehicles have not been shown or described in detail to avoid unnecessarily obscuring descriptions of the embodiments.

Figure 1:
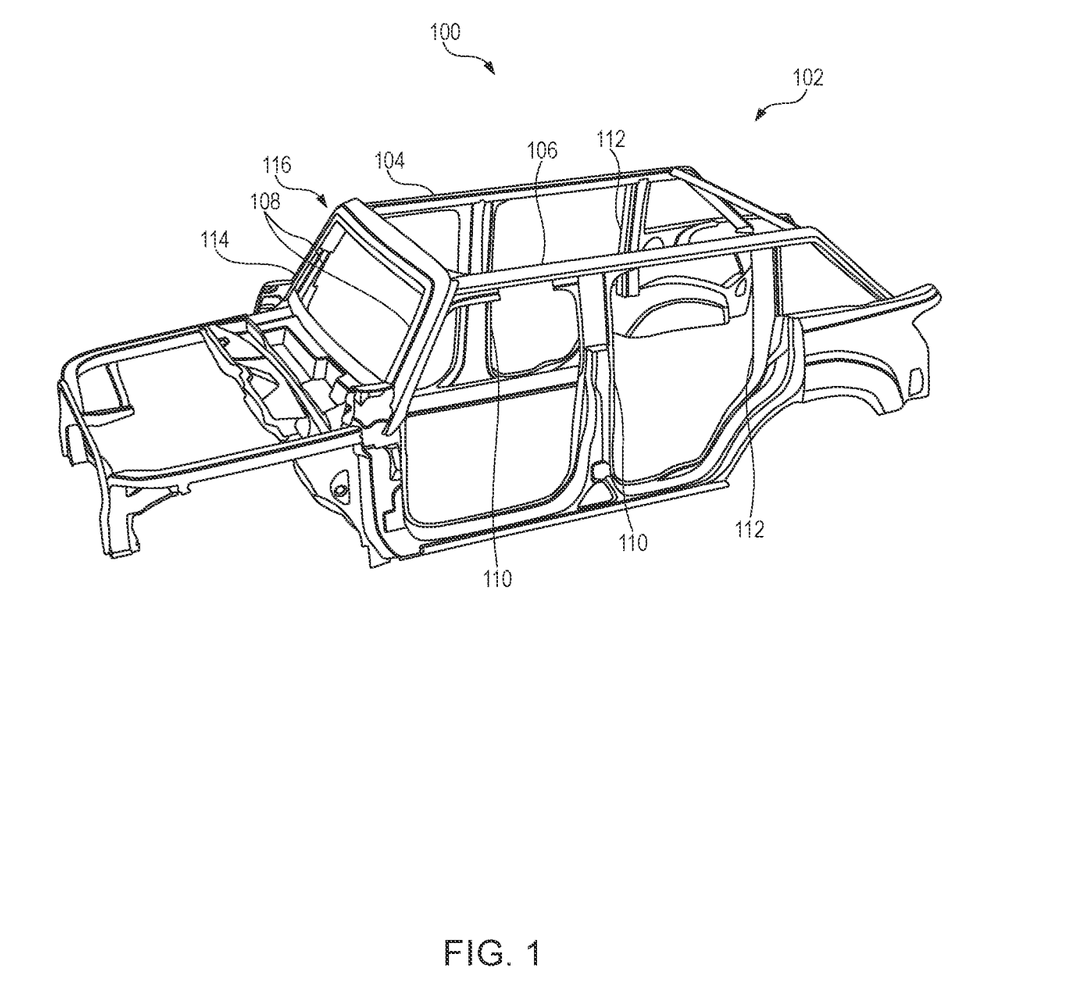
FIG. 1 is a chassis of a vehicle in accordance with the present disclosure.

FIG. 1 is a chassis 100 of a vehicle 102 in accordance with an embodiment of the present disclosure. The vehicle 102 can be an off-road vehicle or a Sport Utility Vehicle (SUV) that includes an open top or an open-air roof configuration, such that a hard top or a soft top roof can be removed. The chassis 100 is a tubular chassis that is formed by joining tubes that includes a first roof beam 104 and a second roof beam 106 that extend along a length of the vehicle 102.

The vehicle 102 is an open-top vehicle, such that the first roof beam 104 and the second roof beam 106 are not coupled to each other in a central location, such as above a passenger and driver seat. Instead, each of the first roof beam 104 and the second roof beam 106 is supported by an A-pillar 108, a B-pillar 110, and a C-pillar 112. The A-pillar 108 is a third beam 108 that is coupled to the first roof beam 104 at a first joint 116. The third beam 108 is positioned behind a windshield frame 114 of the vehicle 102. The first joint 116 is formed to transfer the load to the first roof beam 104. Features of the third beam 108 and the first roof beam 104 are described with respect to FIGS. 2A and 2B, and FIGS. 3A and 3B respectively.

Figure 2A:
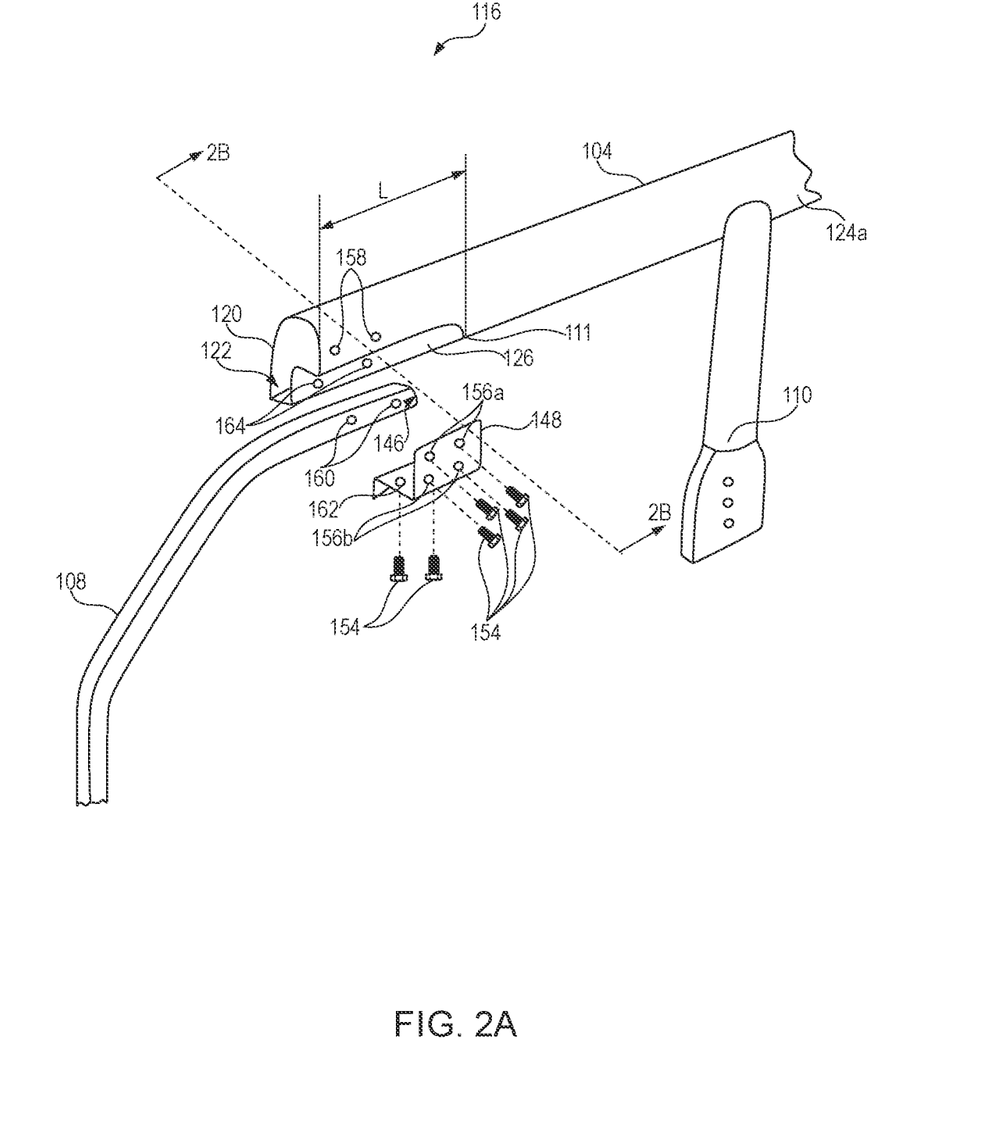
FIG. 2A is a perspective view of a first joint of a roof beam of the vehicle of FIG. 1.
Figure 2B:
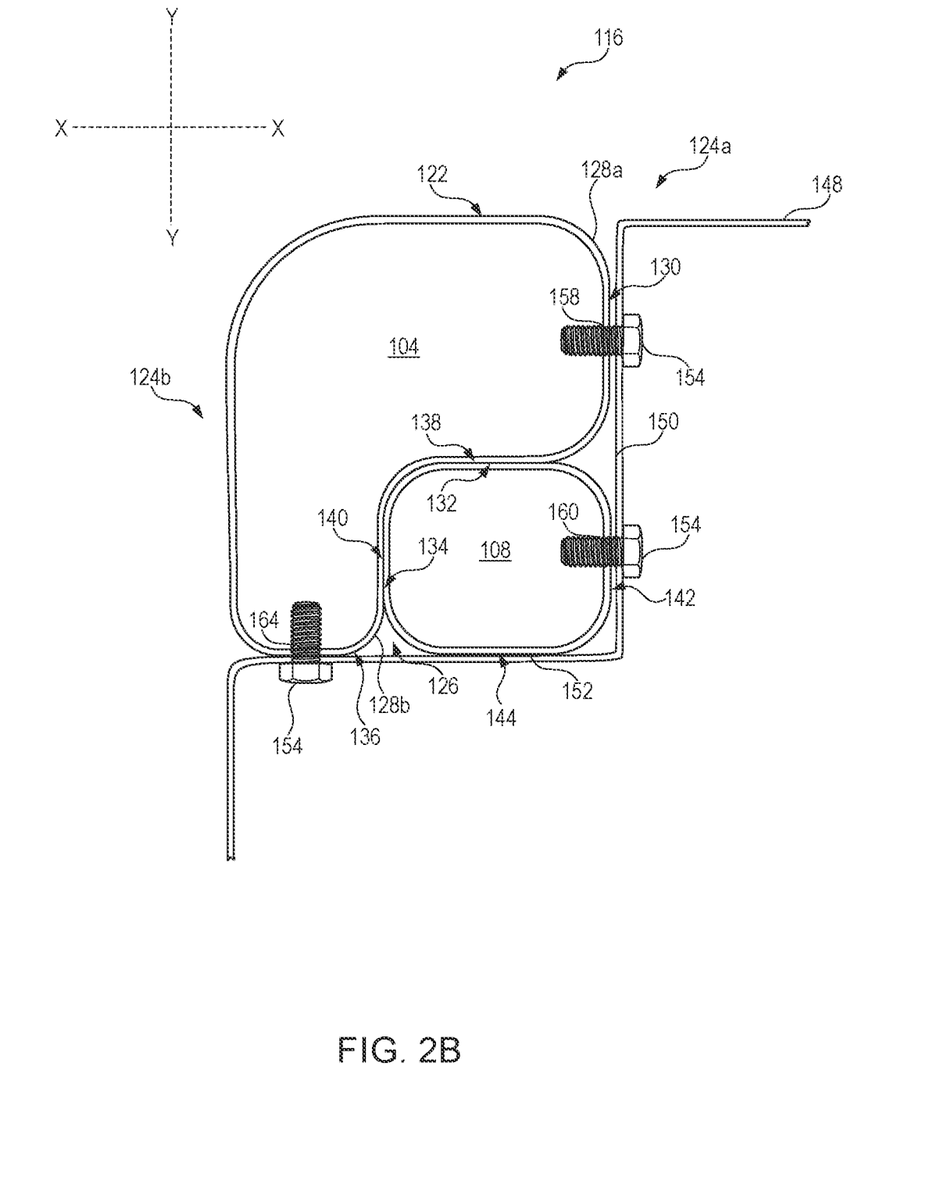
FIG. 2B is a cross-sectional view along line 2B-2B in FIG. 2A.

FIGS. 2A and 2B are different views of the first joint 116, according to an embodiment of the present disclosure. Specifically, FIG. 2A is an exploded perspective view of the first joint 116. FIG. 2B is a cross-sectional view taken along line 2B-2B of an assembled version of the joint 116 of FIG. 2A. The first joint 116 is formed by joining the first roof beam 104 and the third beam 108. The first roof beam 104 has a first end 120 that further includes a first end surface 122. When assembled, the first end surface 122 is behind the windshield frame 114.

The first roof beam 104 has an interior side 124a, that faces towards an interior of the vehicle 102. The first roof beam 104 also includes an indentation 126 at the first end 120. The indentation 126 is at a lower portion of the first end 120 and towards the interior side 124a of the first roof beam 104. The indentation 126 is between an interior upper side 128a and an interior lower side 128b. As shown in FIG. 2A, the indentation 126 extends from the first end surface 122 to an interior location or point 111 along the interior side 124a of the first roof beam 104. The indentation 126 can be formed by different manufacturing techniques, such as hydroforming or stamping. The end or point 111 is spaced from the B-pillar 110 by a distance that is greater than a length L of the indentation 126.

As the first roof beam 104 is tubular, some surfaces of the beam are curved. The indentation or recess may also have curved surfaces configured to receive surfaces of the third beam 108 to create a robust joint. Referring to FIG. 2B, the interior side 124a of the first roof beam 104 includes a plurality of surfaces. For instance, the first roof beam 104 includes a first surface 130 that extends along a Y-axis of the Figure, and a second surface 132 that is transverse from the first surface 130 along an X-axis. The first and second surfaces form edges of an upper volume of the beam 104. Additionally, the first roof beam 104 includes a third surface 134 that is transverse to the second surface 132 along the Y-axis. When assembled, the second surface 132 and the third surface 134 are adjacent to or abut the third beam 108. The first roof beam 104 also includes a fourth surface 136 that traverses to the third surface 134 along the X-axis. The third and fourth surfaces form edges of a lower volume of the beam 104.

A dimension of the surface 130 along the Y-axis is greater than a dimension of the surface 136 along the X-axis, such that the upper volume of the beam 104 is greater than the lower volume. These surfaces of the beam 104 are coupled by curved or rounded corners.

The relative positions of the first surface 130, the second surface 132, the third surface 134, and the fourth surface 136 impart a stepped profile to the indentation 126. For instance, the first surface 130 and the fourth surface 136 define boundaries of the indentation 126 while the second surface 132 and the third surface 134 define inner surfaces of the indentation 126. The first roof beam 104 also has an exterior side 124b that faces an exterior of the vehicle 102. The first surface 130 is spaced further from the exterior side 124b than the third surface 134.

When assembled, the exterior side 124b couples to a portion of the windshield frame 114. The interior side 124a and the exterior side 124b define a perimeter of the first end surface 122. A first cross-sectional area of the first roof beam 104 is bounded by the plurality of surfaces.

The third beam 108 also includes a plurality of surfaces. For instance, the third beam 108 includes a first surface 138 that extends along the X-axis. When assembled, the first surface 138 of the third beam 108 faces and may abut the second surface 132 of the first roof beam 104. The third beam 108 includes a second surface 140 that extends from one side of the first surface 138 along the Y-axis. When assembled, the second surface 140 of the third beam 108 faces and may abut the third surface 134 of the first roof beam 104. The third beam 108 also includes a third surface 142 that extends from another side of the first surface 138 substantially parallel to the second surface 140. A fourth surface 144 of the third beam 108 extends between the second surface 140 and the third surface 142 along the X-axis. The fourth surface 144 of the third beam is coplanar with the fourth surface 136 of the first beam.

The third beam 108 also includes a second end surface 146 (shown in FIG. 2A) that forms a tip or end of the third beam 108. The second end surface 146 is spaced from the first end surface 122 by a distance that is less than or equal to the length L of the indentation 126, in an example. The second end surface 146 is between the point 111 and the first end surface 122 of the first beam 104. Additionally, the second end surface 146 has a second cross-sectional area, such that the first cross-sectional area of the first roof beam 104 is greater than the second cross-sectional area.

The third beam 108 is coupled at the indentation 126 as shown in FIG. 2B such that there is no offset between the third beam 108 and the first roof beam 104. For instance, the third beam 108 is installed inside the indentation 126 in such a way that the fourth surface 144 of the third beam 108 and the fourth surface 136 of the first roof beam 104 are aligned, coplanar, or flush. Similarly, the third surface 142 of the third beam 108 and the first surface 130 are flush when the third beam 108 is coupled to the indentation 126. In other words, in some embodiments, the third beam 108 does not protrude from the first roof beam 104. By positioning the third beam 108 within the indentation or recess of the first roof beam 104 a bracket 148 can be coupled to this joint so that load transfer can occur effectively, while increasing the robustness of the first joint 116.

The vehicle 102 also includes different fasteners and brackets that couple the third beam 108 to the first roof beam 104 at the indentation 126. For instance, the vehicle 102 includes the bracket 148 that couples the third beam 108 and the first roof beam 104. As shown in FIG. 2A, the bracket 148 is coupled between the first end surface 122 of the first roof beam 104 and the second end surface 146 of the third beam 108. Referring now to FIG. 2B, the bracket 148 includes a first portion 150 that extends along the Y-axis and faces the third surface 142 of the third beam 108 and the first surface 130 of the first roof beam 104. The bracket 148 also includes a second portion 152 that extends from one end of the first portion 150 along the X-axis. The second portion 152 faces the fourth surface 144 of the third beam 108 and the fourth surface 136 of the first roof beam 104. When assembled, the bracket 148 couples the third beam 108 to the first beam and holds the third beam 108 in place.

The bracket 148 can be coupled to the first roof beam 104 and the third beam 108 using different ways. One of the ways, as illustrated in FIG. 2A, is by using fastening techniques. The bracket 148 can be attached to the third beam 108 and the first roof beam 104 using a plurality of fasteners 154. Further, the bracket 148 includes an upper pair of holes 156a and a lower pair of holes 156b on the first portion 150 to receive the fasteners 154. The first surface 130 of the first roof beam 104 also includes a first pair of holes 158 that align with the upper pair of the holes 156a of the bracket 148. In addition, the third surface 142 of the third beam 108 also includes a second pair of holes 160 that aligns with the lower pair of holes 156b of the bracket 148. The bracket 148 includes a third pair of holes 162 (only one of the holes 162 is seen in FIG. 2A), and the fourth surface 136 of the first roof beam 104 includes a fourth pair of holes 164 that are aligned with each other. Although the present illustration shows different pairs of holes, more or lesser numbers of holes can be made to provide requisite strength at the first joint 116.

Figure 3A:
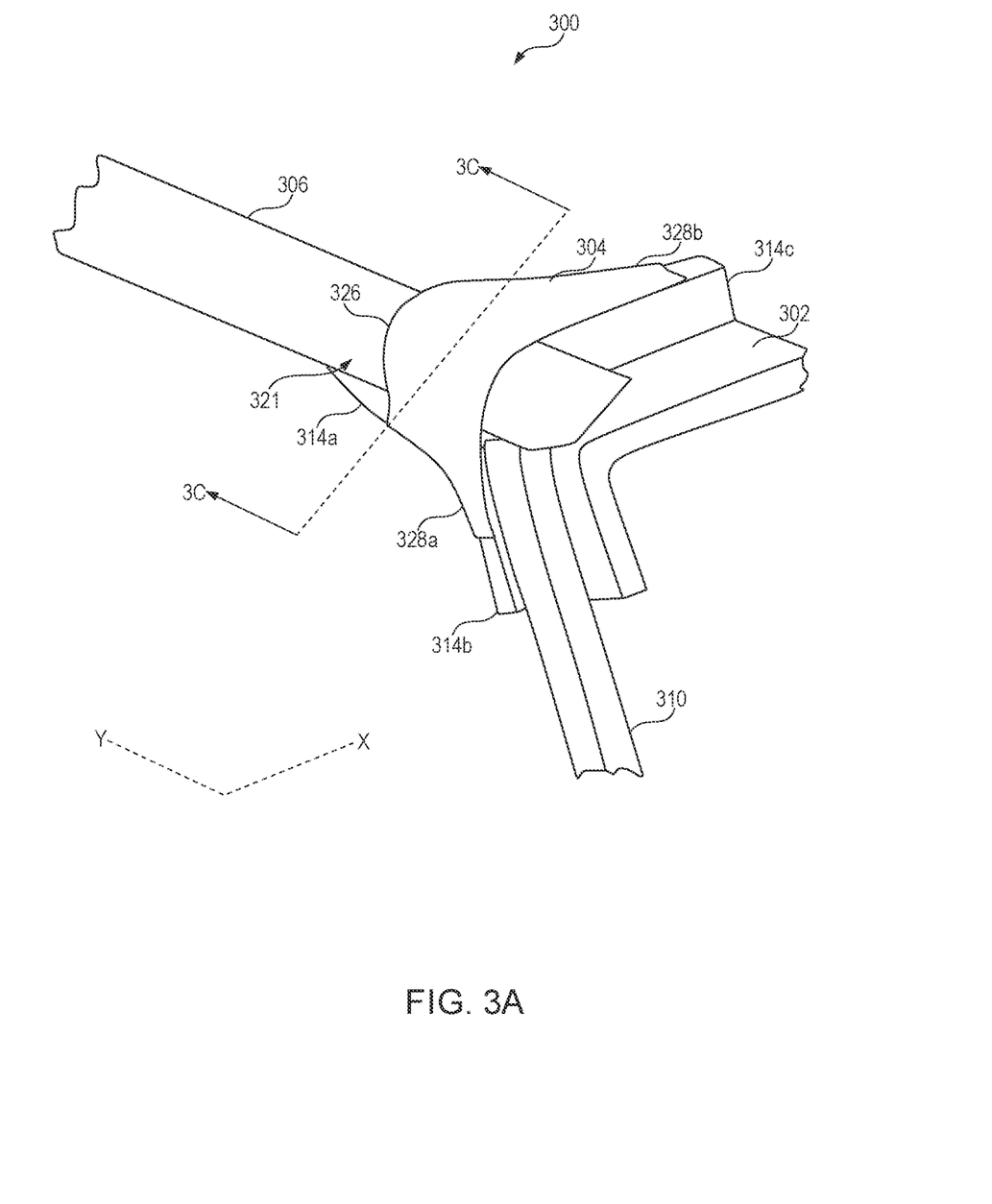
FIG. 3A is a perspective view of an alternative embodiment of a joint of a vehicle when viewed from an exterior of the vehicle.
Figure 3B:
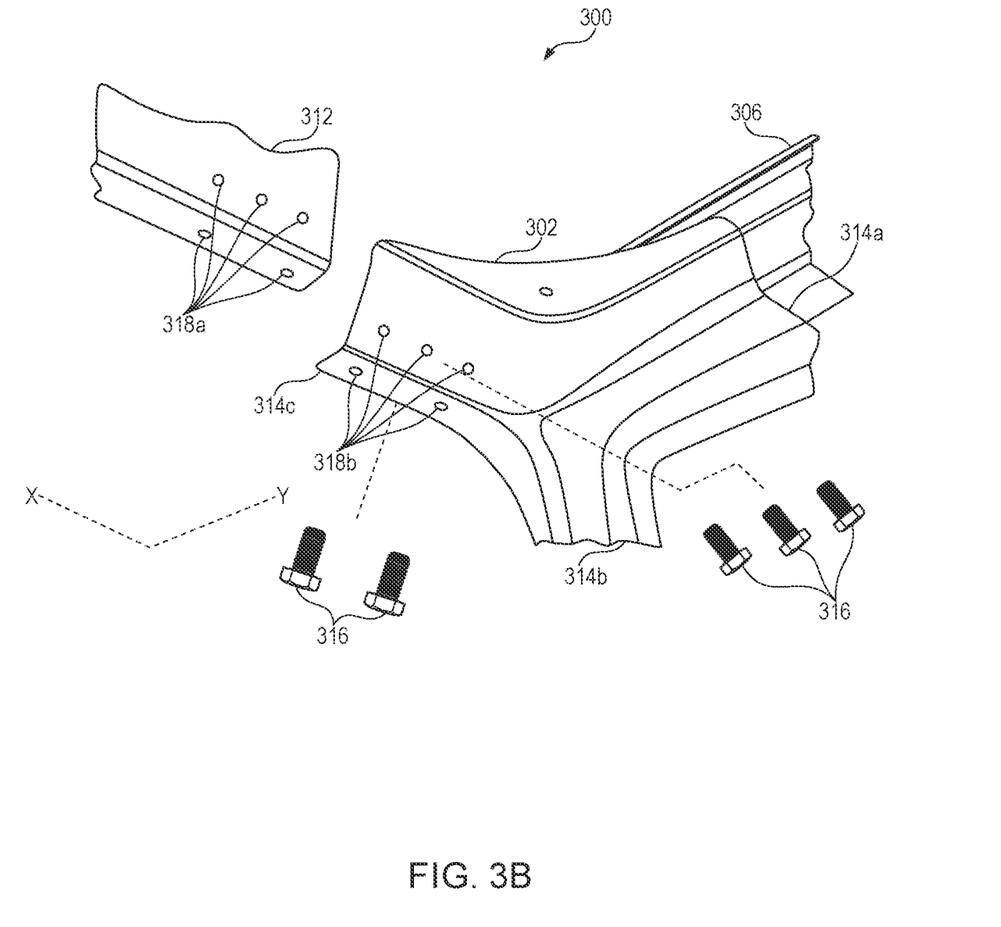
FIG. 3B is a perspective view of the joint of FIG. 3A, when viewed from an interior of the vehicle.
Figure 3C:
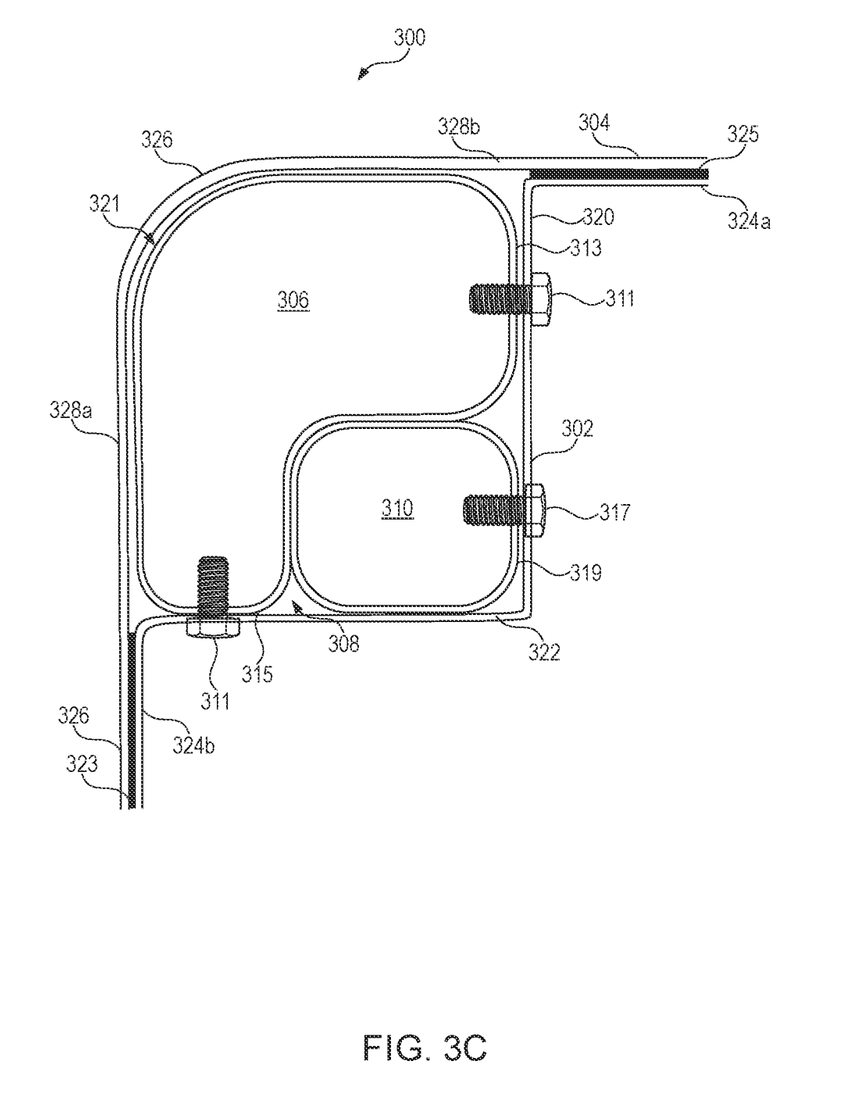
FIG. 3C is a cross-sectional view of the joint taken along line 3C-3C of FIG. 3A.

FIGS. 3A through 3C are directed to an alternative embodiment of a vehicle that includes a joint 300. Specifically, FIG. 3A is a perspective view of the joint 300 of the vehicle that includes a first bracket 302 and a second bracket 304 that are secured to a first beam or roof rail 306, a second beam 310, and a third beam 312. FIG. 3A is viewed from an exterior of the vehicle while FIG. 3B is a perspective view from an interior of the vehicle. FIG. 3C illustrates a cross-sectional view of the joint 300 taken along line 3C-3C of FIG. 3A.

The first beam 306 is along a length of the vehicle, along a side of the roof. A similar beam runs substantially parallel to the first beam 306, where one is along a passenger side of the vehicle and the other is along a driver side of the vehicle. The joint 300 is configured to support the roof where fewer cross-beams or other roof beams extend between the passenger side and driver side roof beams 306 are included. This allows for the roof (hard or soft) to be removed.

The first bracket 302 is an interior facing bracket that has a larger surface area than the second bracket 304, which is an exterior facing bracket. The first bracket 302 is attached to at least two of the beams and can be coupled to all three beams. The first bracket 302 is also coupled to the second bracket. In some embodiments, the second bracket 304 is only coupled to the first bracket and is not coupled to any of the beams with a fastener.

As shown in FIG. 3C, the first beam 306 includes a recess 308 on the interior, or cabin facing side of the beam 306. The recess has curved walls that are sized and shaped to receive the second beam 310. The second beam is configured to be a support along a side of the windshield. A cross-sectional area of the second beam is less than a cross-sectional area of the first beam. This is related to the different functions of these beams, i.e. roof rails as compared to an A-pillar along the windshield.

The second beam 310 is transverse to the third beam 312 and the first beam 306 as shown in FIG. 3B. The second beam 310 and the third beam 312 are configured support a windshield of the vehicle, where the third beam extends between the first beam, roof rail and the opposing roof rail.

According to the present disclosure, the first beam 306, the second beam 310, and the third beam 312 are coupled to each other using the first bracket 302 and the second bracket 304. In one example, the first bracket 302 is coupled to an interior side of the first beam 306 while the second bracket 304 is on an exterior side of the first beam 306, as shown in FIG. 3C. Fasteners 311 couple the first bracket 302 to a first side 313 and a second side 315 of the first beam 306. Another fastener 317 may couple the first bracket to a first side 319 the second beam 310.

Referring now to FIGS. 3A and 3B, the first bracket 302 includes a first extension 314a that, when assembled, is aligned with and coupled to the first beam 306. In other words, the first extension 314a is shaped to accommodate the first beam 306. The first bracket 302 also includes a second extension 314b that extends from the first bracket 302 and is aligned with the second beam 310 when assembled. The first bracket 302 also includes a third extension 314c that extends transverse to the first extension 314a and the second extension 314b. The third extension 314c is aligned with and coupled the third beam 312 when the joint 300 is assembled. In one example, the third extension 314c and the third beam 312 are coupled to each other using a plurality of fasteners 316, as shown in FIG. 3B. The third extension 314c has holes 318a and the third beam 312 has holes 318b that receive the fasteners 316 when assembled.

In FIG. 3C, the first bracket 302 includes a first portion 320 and a second portion 322 that are transverse to each other. The first bracket 302 includes a first flange 324a that is transverse to the first portion 320. The first flange 324a is an edge of the third extension 314c (shown in FIG. 3B). In addition, the first bracket 302 includes a second flange 324b that is transverse to the second portion 322 and is an edge of the second extension 314b (shown in FIG. 3B).

On the other hand, the second bracket 304 has a curved section 326 that covers or curves around an exterior surface 321 of the first beam 306. The second bracket 304 has a first side 328a that extends from the curved section 326 toward the first bracket. The first side 328a is coupled to the edges of the second extension 314b. For example, the second flange 324b of the first bracket 302 may be welded or otherwise coupled with a coupling material 323 to the first side 328a. The second bracket 304 has a second side 328b that couples to the edges of the third extension 314c, such as with a coupling material 325 that is between the second side 328b and the first flange 324a. As a result, the first bracket 302 and the second bracket 304 may mitigate any relative play between the first beam 306 and the second beam 310.

The various embodiments described above can be combined to provide further embodiments. All of the U.S. patents, U.S. patent application publications, U.S. patent applications, foreign patents, foreign patent applications, and non-patent publications referred to in this specification and/or listed in the Application Data Sheet are incorporated herein by reference, in their entirety. Aspects of the embodiments can be modified, if necessary to employ concepts of the various patents, applications, and publications to provide yet further embodiments.

These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

The invention claimed is:

1. A vehicle, comprising:
   a first roof beam including:
      a first end surface; and
      an indentation at the first end surface;
   a second beam including:
      a second end surface, the second beam being coupled to the first roof beam at the indentation; and
   a bracket coupled to the first roof beam and the second beam, the bracket including a portion coupled to interior flat sides of the first roof beam and the second beam, the interior flat sides of the first roof beam and the second beam being flush with each other.

2. The vehicle of claim 1, wherein the first end surface is spaced from the second end surface by a distance, the bracket being coupled to the first roof beam and the second beam between the first end surface and the second end surface.

3. The vehicle of claim 2 wherein the first roof beam has a first cross-sectional area and the second beam includes a second cross-sectional area, the first cross-sectional area being greater than the second cross-sectional area.

4. The vehicle of claim 1, wherein the bracket is coupled to the second beam and the first roof beam at the indentation.

5. The vehicle of claim 4 wherein the first roof beam includes an exterior side and the interior flat side, the indentation being positioned on the interior flat side.

6. The vehicle of claim 5 wherein the second beam is on the interior flat side of the first roof beam.

7. The vehicle of claim 6 wherein the second beam is between the bracket and the first roof beam.

8. A vehicle, comprising:
   a first roof beam having a first cross-sectional area, the first roof beam including:
      an end; and
      an indentation at the end;
   a second beam having a second cross-sectional area being smaller than the first cross-sectional area, the second beam being coupled to the first roof beam at the indentation; and
   a bracket coupled to the first roof beam and the second beam, the bracket including a first portion coupled to interior flat sides of the first roof beam and the second beam, the interior flat sides of the first roof beam and the second beam being flush with each other.

9. The vehicle of claim 8 wherein the indentation extends from a first end surface to an interior location of the first roof beam, a second end surface of the second beam being positioned between the first end surface and the interior location of the first roof beam.

10. The vehicle of claim 8, wherein the second beam is between the bracket and the first roof beam.

11. The vehicle of claim 10 wherein the bracket includes a second portion coupled to lower flat sides of the first roof beam and the second beam.

12. The vehicle of claim 8 wherein the first roof beam includes a first surface at the end, the first surface being transverse to a second surface, and a third surface being transverse to the second surface, the indentation including the first surface, the second surface, and the third surface.

13. The vehicle of claim 12 wherein the second beam includes a first surface that faces the second surface of the first roof beam and the second beam includes a second surface that faces the third surface of the first roof beam.

14. The vehicle of claim 13, wherein the first surface of the first roof beam and a third surface of the second beam are coupled to the first portion of the bracket.

15. The vehicle of claim 14 wherein the bracket includes a second portion that is coupled to a fourth surface of the first roof beam and a fourth surface of the second beam.

16. A vehicle, comprising:
a first beam that includes:
a recess;
a second beam coupled to the first beam at the recess;
a first bracket coupled to an interior side of the first beam and the second beam, the first bracket including a portion coupled to interior flat sides of the first beam and the second beam, the interior flat sides of the first beam and the second beam being flush with each other; and a second bracket coupled to an exterior side of the first beam.

17. The vehicle of claim 16 wherein the first beam includes a first cross-sectional area and the second beam includes a second cross-sectional area that is less than the first cross-sectional area.

18. The vehicle of claim 17 wherein the first bracket includes a first extension that aligns with the first beam and a second extension that aligns with the second beam.

19. The vehicle of claim 18 wherein the first bracket includes a third extension that is transverse to the first and second extensions and a third beam that is coupled to the first beam, the third beam being aligned with the third extension of the first bracket.

20. The vehicle of claim 18 wherein the first bracket includes a third extension that is transverse to the first and second extensions, the second bracket being coupled to the edges of the first extension and the third extension of the first bracket.

* * * * *